(12) United States Patent
Sisk et al.

(10) Patent No.: US 9,085,238 B2
(45) Date of Patent: Jul. 21, 2015

(54) ENERGY STORAGE CONTROL SYSTEM AND METHOD

(71) Applicant: Johnson Controls Technology Company, Holland, MI (US)

(72) Inventors: Brian C. Sisk, Mequon, WI (US); Thomas M. Watson, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/014,270

(22) Filed: Aug. 29, 2013

(65) Prior Publication Data

US 2014/0207318 A1 Jul. 24, 2014

Related U.S. Application Data

(60) Provisional application No. 61/751,409, filed on Jan. 11, 2013, provisional application No. 61/800,208, filed on Mar. 15, 2013.

(51) Int. Cl.
| | |
|---|---|
| *B60L 9/00* | (2006.01) |
| *H02J 7/14* | (2006.01) |
| *G01N 27/416* | (2006.01) |

(Continued)

(52) U.S. Cl.
CPC .............. *B60L 1/00* (2013.01); *B60L 11/1857* (2013.01); *B60L 11/1861* (2013.01); *B60L 11/1864* (2013.01); *H02J 7/1423* (2013.01); *B60L 2240/545* (2013.01); *B60L 2240/547* (2013.01); *B60L 2240/549* (2013.01); *B60L 2240/80* (2013.01); *B60L 2260/44* (2013.01); *Y02T 10/7005* (2013.01); *Y02T 10/7044* (2013.01); *Y02T 10/7061* (2013.01)

(58) Field of Classification Search
USPC ...................... 701/22; 320/132, 134; 324/426
See application file for complete search history.

(56) References Cited

U.S. PATENT DOCUMENTS

| | | | |
|---|---|---|---|
| 5,773,962 A | 6/1998 | Nor | |
| 5,896,023 A | 4/1999 | Richter | |

(Continued)

FOREIGN PATENT DOCUMENTS

| | | |
|---|---|---|
| EP | 2246956 | 11/2010 |
| FR | 2905915 | 3/2008 |
| GB | 2478557 A | 9/2011 |

OTHER PUBLICATIONS

International Search Report & Written Opinion for International Application No. PCT/US2013/077206 mailed Jan. 26, 2015.

*Primary Examiner* — Thomas G Black
*Assistant Examiner* — Tyler Paige
(74) *Attorney, Agent, or Firm* — Fletcher Yoder, P.C.

(57) ABSTRACT

A system for providing power to a power network includes an energy storage device connected to the power network, a sensor connected with the energy storage device for measuring a state of the energy storage device during a rest period, which corresponds to a time span during which a current through the energy storage device is reduced to a level that enables an estimation of a state of the energy storage device. The system further includes a controller connected to the sensor for measuring a state of the energy storage device. The controller selectively establishes rest periods for the energy storage device. The rest periods are established by optimizing between minimization of disruption to normal operation and a need to update a measurement of the state of the energy storage device.

28 Claims, 11 Drawing Sheets

(51) Int. Cl.
   *B60L 1/00*   (2006.01)
   *B60L 11/18*  (2006.01)

(56) References Cited

U.S. PATENT DOCUMENTS

| | | | |
|---|---|---|---|
| 6,331,762 B1* | 12/2001 | Bertness | 320/134 |
| 7,116,078 B2 | 10/2006 | Colombo et al. | |
| 7,710,119 B2* | 5/2010 | Bertness | 324/426 |
| 7,768,233 B2* | 8/2010 | Lin et al. | 320/132 |
| 7,888,912 B2 | 2/2011 | Morita et al. | |
| 8,143,855 B2* | 3/2012 | Davis | 320/126 |
| 8,493,022 B2* | 7/2013 | Bertness | 320/104 |
| 8,783,396 B2* | 7/2014 | Bowman | 180/65.285 |
| 2006/0125483 A1* | 6/2006 | Bertness | 324/426 |
| 2009/0091299 A1* | 4/2009 | Lin et al. | 320/137 |
| 2009/0218989 A1* | 9/2009 | Davis | 320/136 |
| 2010/0295514 A1* | 11/2010 | Burlak et al. | 320/160 |
| 2010/0318252 A1 | 12/2010 | Izumi | |
| 2012/0293132 A1 | 11/2012 | Kaino et al. | |
| 2013/0006455 A1 | 1/2013 | Li | |

* cited by examiner

ENERGY STORAGE CONTROL SYSTEM AND METHOD

RELATED APPLICATIONS

This application claims the benefits under 35 U.S.C. 119(e) of Provisional Patent Application Ser. No. 61/751,409, filed Jan. 11, 2013, and of Provisional Patent Application Ser. No. 61/800,208, filed on Mar. 15, 2013, both of which are hereby incorporated by reference.

BACKGROUND

Unless otherwise indicated herein, the materials described in this section are not prior art to the claims in this application and are not admitted to be prior art by inclusion in this section.

A vehicle that uses one or more battery systems for supporting propulsion, start stop, and/or regenerative braking functions can be referred to as an xEV, where the term "xEV" is defined herein to include all of the below described electrical vehicles, or any variations or combinations thereof.

A "start-stop vehicle" is defined as a vehicle that can disable the combustion engine when the vehicle is stopped and utilize a battery (energy storage) system to continue powering electrical consumers onboard the vehicle, including the entertainment system, navigation, lights, or other electronics, as well as to restart the engine when propulsion is desired. A lack of brake regeneration or electrical propulsion distinguishes a "start-stop vehicle" from other forms of xEVs.

As will be appreciated by those skilled in the art, hybrid electric vehicles (HEVs) combine an internal combustion engine (ICE) propulsion system and a battery-powered electric propulsion system, such as 48 volt, 130 volt, or 300 volt systems. The term HEV may include any variation of a hybrid electric vehicle, in which features such as brake regeneration, electrical propulsion, and stop-start are included.

A specific type of xEV is a micro-hybrid vehicle ("mHEV" or "micro-HEV"). Micro-HEV vehicles typically operate at low voltage, which is defined to be under 60V. Micro-HEV vehicles typically provide start stop, and distinguish themselves from "start-stop vehicles" through their use of brake regeneration. The brake regeneration power can typically range from 2 kW to 12 kW at peak, although other values can occur as well. A micro-HEV vehicle can also provide some degree of electrical propulsion to the vehicle. If available, the amount of propulsion will not typically be sufficient to provide full motive force to the vehicle.

Full hybrid systems (FHEVs) and Mild hybrid systems (Mild-HEVs) may provide motive and other electrical power to the vehicle using one or more electric motors, using only an ICE, or using both. FHEVs are typically high-voltage (>60V), and are usually between 200V and 400V. Mild-HEVs typically operate between 60V and 200V. Depending on the size of the vehicle, a Mild-HEV can provide between 10-20 kW of brake regeneration or propulsion, while a FHEV provides 15-100 kW. The Mild-HEV system may also apply some level of power assist, during acceleration for example, to supplement the ICE, while the FHEV can often use the electrical motor as the sole source of propulsion for short periods, and in general uses the electrical motor as a more significant source of propulsion than does a Mild-HEV.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of xEV that include all-electric or battery electric vehicles (BEVs), plug-in hybrid electric vehicles (PHEVs), and electric vehicle conversions of hybrid electric vehicles and conventional ICE vehicles. BEVs are driven entirely by electric power and lack an internal combustion engine. PHEVs have an internal combustion engine and a source of electric motive power, with the electric motive power capable of providing all or nearly all of the vehicle's propulsion needs. PHEVs can utilize one or more of a pure electric mode ("EV mode"), a pure internal combustion mode, and a hybrid mode.

xEVs as described above may provide a number of advantages as compared to more traditional gas-powered vehicles using only ICEs and traditional electrical systems, which are typically 12 volt systems powered by a lead acid battery. For example, xEVs may produce fewer undesirable emission products and may exhibit greater fuel efficiency as compared to traditional vehicles and, in some cases, such xEVs may eliminate the use of gasoline entirely, as is the case of certain types of BEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

Conventional xEVs have been found to be functionally limited by their electric energy systems that supply power to their electric motor/generator and vehicle accessories. Typically, an electric motor is powered by an energy source that needs to store energy suitable for high-power discharges as well as for electric demands generated by various driving conditions.

Vehicle batteries need be carefully managed to facilitate proper, stable operation. Various characteristics of the battery may be measured, including the temperature, voltage, current, and others. Other states must be estimated from the measurable characteristics, such as the total capacity and the "state of charge" (SOC), which is the measure of the amount of energy available in a battery. For xEVs, battery characteristics are sensitive to the conditions under which they are measured. It can therefore be difficult to both use and characterize the battery at the same time. In electric or hybrid vehicles, the SOC allows for an estimate of the potential distance that may be travelled by the vehicle.

Estimates of SOC are made frequently as part of the typical vehicle operation. Many means of estimating SOC exist, but most methods use some combination of two primary methods: voltage lookup and current integration. The voltage lookup method utilizes the fact that a battery's open-circuit voltage changes with the state of charge. This method would utilize a transfer function to allow a measured voltage to be used as a means of determining the SOC. The current integration method starts with a known SOC and total capacity of the battery, and adds/subtracts the electrical charge throughput from the battery.

Each of these methods has significant disadvantages. The voltage lookup method suffers from the fact that the battery's terminal voltage is only equal to the open-circuit voltage when the current is zero and the battery is completely equilibrated—something that rarely happens in practice. Further, for some battery chemistries the open-circuit voltage is nearly constant over a wide range of SOC values, making the voltage a poor predictor of SOC. The current integration suffers from the fact that accuracy degrades gradually due to measurement error and bias and non-unity battery coulombic efficiencies.

State estimation, and in particular SOC estimation, is important in the utilization of most forms of lithium-ion batteries. This is true because the battery can be damaged, or become unstable, if operated outside proscribed operating conditions. Further, lithium-ion lacks a "redox shuttle" or "top-charge" reaction that is found for nickel-metal and lead-acid chemistries, in which overcharging the battery (within limits) creates harmless byproducts. Therefore, safe operation requires the SOC be known with some reasonable level of precision.

Typically, reliable state estimation of an energy storage device, such as SOC estimation, can only be made infrequently. For example, SOC estimation based on open-circuit voltage can only occasionally be performed, and only when the vehicle is not being operated. As such, any estimate of the SOC of the energy storage device increases in inaccuracy during vehicle operation, as the time since the last accurate measurement increases. This effect is especially true of micro-hybrid, mild-hybrid, and hybrid-electric vehicles, due to the relative heavy charge/discharge duty cycles.

To overcome these inaccurate SOC estimations, conventional approaches simply provide a wide margin for operational error. Providing a large margin for operational error can significantly increase the size of the battery, increasing the cost of the vehicle overall. Reducing the error margin without a corresponding increase in accuracy can lead to overcharges and undercharges of the energy storage device, which may cause instability, failure and/or shortening of the life of the energy storage device.

Therefore, there is need for a system and method that enable accurate estimations of a state of an energy storage device used in vehicle batteries, particularly those (such as micro hybrid, mild hybrid, and hybrid-electric vehicles that utilize high-power brake regeneration and electric propulsion.

SUMMARY

Disclosed herein is an energy storage control system and method.

In one aspect, a system for providing power to a vehicle power network includes an energy storage device connected to the power network, a sensor connected with the energy storage device for measuring a state of the energy storage device during a rest period, which corresponds to a time span during which a current through the energy storage device is reduced to a level that enables an estimation of a state. The system further includes a controller connected to the sensor for estimating a state of the energy storage device based on available data which may include voltage data, current data, temperature data, and other data. The controller establishes rest periods for the energy storage device. The rest periods are established by optimizing between minimization of disruption to normal vehicle operation and a need to update a measurement of the state of the energy storage device.

In another aspect, a computer-implemented method for controlling the application of stored electrical power to a power network is provided. To the power network is connected an ESS to provide stored power electrical current to the power network for operation of a power network load. The ESS includes one or more energy storage devices, which may include lead acid, lithium-ion, NiMH, zinc-bromine, lithium-sulfur, flow batteries, polyvalent batteries and metal-air batteries and other types of batteries. Likewise, different types of capacitors may be used, such as electrolytic, electric double layer capacitors (EDLC), lithium capacitor, pseudo-capacitors, asymmetric capacitors, ultra-capacitors, or other types of capacitors. In the case that the ESS includes multiple energy storage devices, the devices may be connected to each other electrically, either directly or via a regulation device, such as a DC/DC convertor, switch, or similar device. One or more of the energy storage devices can also be connected to the vehicle powernet, either directly or via a regulation device. The method includes establishing energy storage device rest periods during which a current through the energy storage device is reduced to a level that enables estimation of a state. Additionally, the rest periods are established by optimizing between minimization of disruption to normal vehicle operation and a need to update a measurement of the energy storage device. The method further includes measuring a state of the "resting" energy storage device during the rest periods.

In yet another aspect, a computing system includes a processing unit and a storage device storing instructions that are operable, when executed by the processing unit, to cause the processing unit to perform a method for measuring a state of an energy storage device during a rest period. The method includes establishing rest periods during which the current through the energy storage device is reduced to a level that enables estimation of a state. Reducing the current through the device can be accomplished by physically disconnecting the device from the vehicle powernet, or by using a controller to maintain a reduced current. This method also measures the state of the energy storage device, receives information regarding a state of the energy storage device from a sensor during the rest period, stores the information about the energy storage device, and determines a level of confidence in the accuracy of the stored information regarding the state. The method further includes evaluating a level of disruption to normal operation that would be caused by disconnection of the energy storage device, and determining, based upon both the level of confidence in the accuracy of the stored state and the level of disruption to the strategy that disconnection of the energy storage device would cause, when to establish a rest period for a new state measurement and storage of a new state of the energy storage device.

In yet another aspect, a system for providing power to a vehicle power network includes an energy storage system having a plurality of energy storage devices that connected to the vehicle power network. The system further includes a controller that establishes rest periods for the each of the plurality of energy storage devices during which a current through the respective energy storage device is reduced to near zero amperes, the rest periods established according to a strategy of operation so as to not adversely affect the normal operation of the vehicle.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
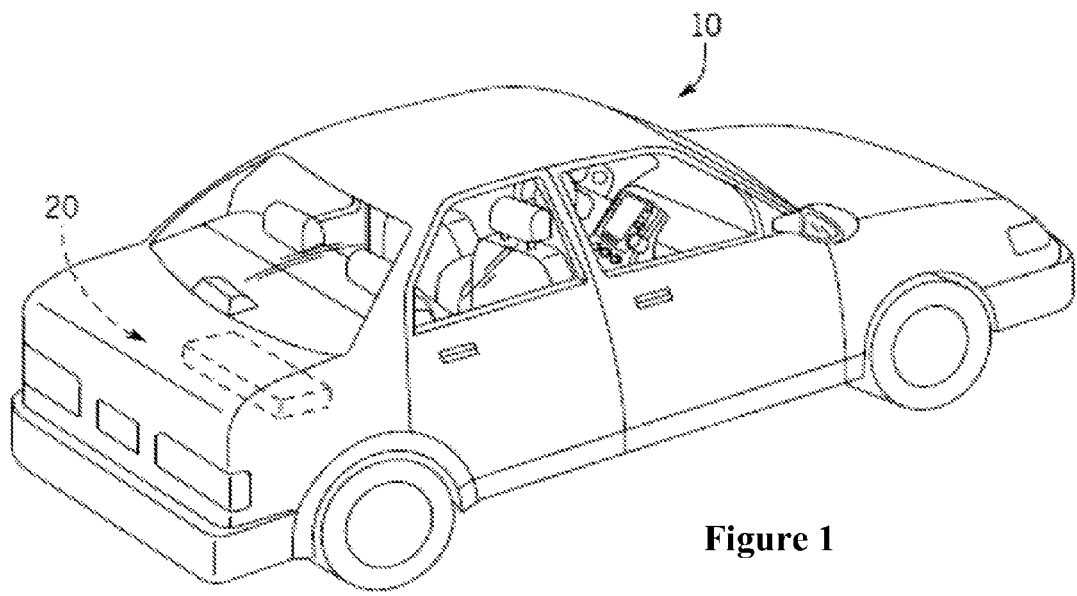
FIG. 1 is a perspective view of a vehicle (an xEV) having a battery system contributing all or a portion of the power for the vehicle, in accordance with an embodiment of the present approach.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, there are several different types of xEVs. Although some vehicle manufacturers, such as Tesla, produce only xEVs and, thus, can design the vehicle from scratch as an xEV, most vehicle manufacturers produce primarily traditional ICEs. Thus, when one of these manufacturers also desires to produce an xEV, it often utilizes one of its traditional vehicle platforms as a starting point. As can be appreciated, when a vehicle has been initially designed to use a traditional electrical system powered by a single lead acid battery and to utilize only an ICE for motive power, converting such a vehicle into its HEV version can pose many packaging problems. For example, a FHEV uses not only these traditional components, but one or more electric motors must be added along with other associated components. As another example, a mHEV also uses not only these traditional components, but a higher voltage battery (e.g., a 48V lithium ion battery module) must be placed in the vehicle to supplement or replace the 12V lead acid battery along with other components such as a belt integrated starter-generator, sometimes referred to as a belt alternator starter (BAS) as described in further detail below. Hence, if a battery system can be designed to reduce such packaging problems, it would make the conversion of a traditional vehicle platform into an xEV less costly and more efficient. As used herein, the BAS is not intended to be limited to a belt-driven alternator starter, as other types of drives could be used.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. Presently disclosed embodiments include lithium ion battery modules that are capable of providing more than one voltage. In particular, certain disclosed battery systems may provide a first voltage (e.g., 12V), for example, to power ignition of a combustion engine using a traditional starter motor and/or support conventional 12V accessory loads, and may provide a second voltage (e.g., 48V), for example, to power a BAS and to power one or more vehicle accessories when the combustion engine is not running, for use in a micro-hybrid system for example. Indeed, in certain embodiments, not only may a single battery system provide two voltages (e.g., 12V and 48V), but it can provide them from a package having a form factor equivalent to a traditional lead acid 12V battery, thus making packaging and conversion of a traditional vehicle to a mHEV simpler, less costly and more efficient.

Present embodiments also include physical battery module features, assembly components, manufacturing and assembling techniques, and so forth, that facilitate providing disclosed battery modules and systems that have a desired form factor (e.g., dimensions corresponding to a traditional lead acid battery). Further, as set forth in detail below, the disclosed battery module embodiments include a number of heat transfer devices (e.g., heat sinks, liquid-cooling blocks, heat transfer foams, phase change materials (PCMs), and so forth) that may be used to passively or actively maintain one or more temperatures of the battery module during operation.

With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a mHEV, including an ICE equipped with a micro-hybrid system which includes a start-stop system that may utilize the battery system (energy storage system) 20 to power at least one or more accessories (e.g., AC, lights, consoles, etc.), as well as the ignition of the ICE, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
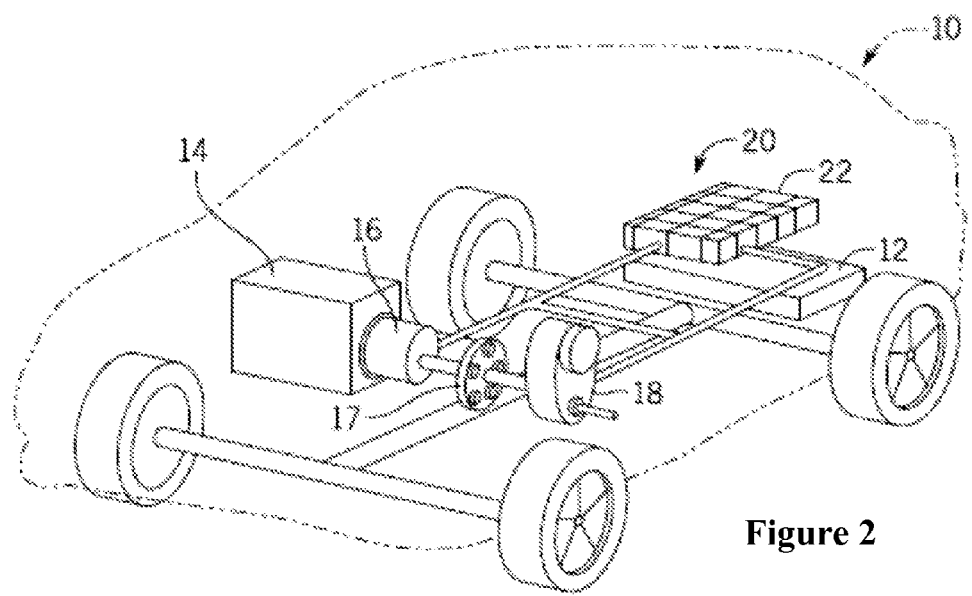
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an ICE 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the combustion engine 14 alone, or by both the battery system 20 and the engine 14. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion electrochemical cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22.

Figure 3:
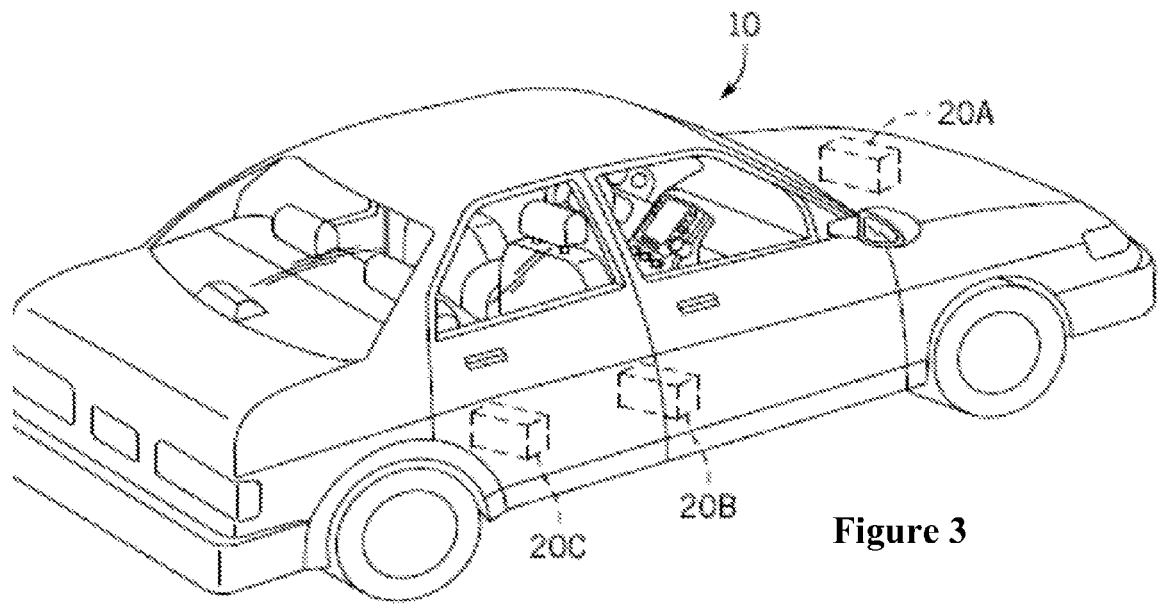
FIG. 3 is a cutaway schematic view of an embodiment of the xEV of FIG. 1 in the form of a micro-hybrid electric vehicle (mHEV), in accordance with an embodiment of the present approach.

FIG. 3 illustrates a cutaway schematic view of another embodiment of the xEV 10 of FIG. 1, provided in the form of a mHEV 10 having the battery system 20. As discussed above, the battery system 20 for use with a micro-hybrid system of an mHEV 10 may include a single battery that provides a first voltage (e.g. 12V) and a second voltage (e.g. 48V) and that is substantially equivalent in size to a traditional 12V lead acid battery used in traditional ICEs. Hence, such a battery system 20 may be placed in a location in the mHEV 10 that would have housed the traditional battery prior to conversion to an mHEV. For example, as illustrated in FIG. 3, the mHEV 10 may include the battery system 20A positioned similarly to a lead-acid battery of a typical combustion-engine vehicle (e.g., under the hood of the vehicle 10). By further example, in certain embodiments, the mHEV 10 may include the battery system 20B positioned near a center of mass of the mHEV 10, such as below the driver or passenger seat. By still further example, in certain embodiments, the mHEV 10 may include the battery system 20C positioned below the rear passenger seat or near the trunk of the vehicle. It should be appreciated that, in certain embodiments, positioning a battery system 20 (e.g., battery system 20B or 20C) in or about the interior of the vehicle may enable the use of air from the interior of the vehicle to cool the battery system 20 (e.g., using a heat sink or a forced-air cooling design, as set forth in detail below).

Figure 4:
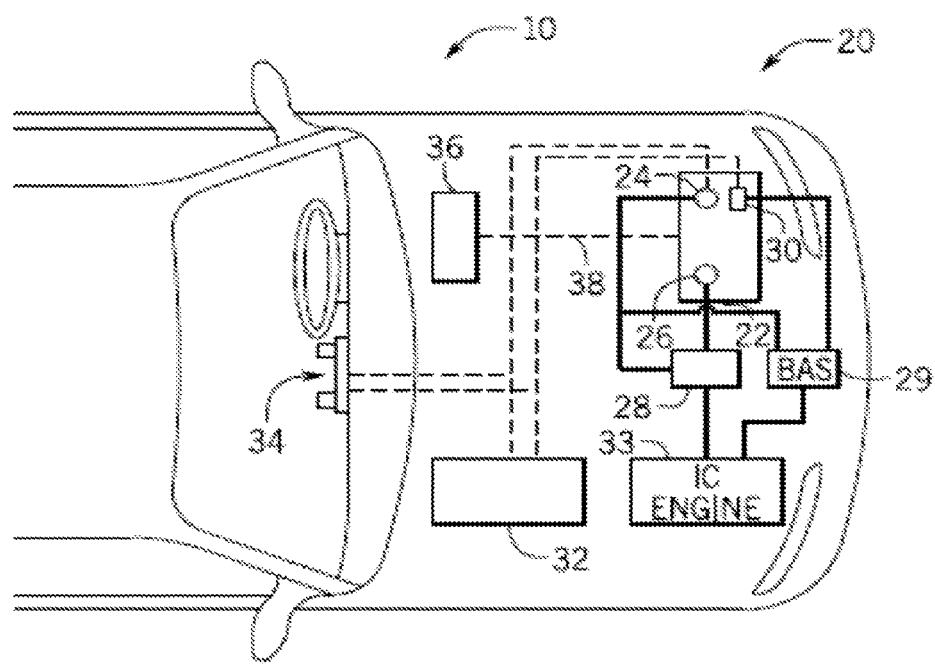
FIG. 4 is a schematic view of the mHEV embodiment of FIG. 3 illustrating power distribution throughout the mHEV, in accordance with an embodiment of the present approach.

FIG. 4 is a schematic view of an embodiment of the mHEV 10 of FIG. 3 having an embodiment of an energy system 21 disposed under the hood of the vehicle 10 and includes battery system 20. As previously noted and as discussed in detail below, the battery system 20 may further have dimensions comparable to those of a typical lead-acid battery to limit or eliminate modifications to the mHEV 10 design to accommodate the battery system 20. Further, the battery system 20 illustrated in FIG. 4 is a three-terminal battery that is capable of providing two different output voltages. For example, a first terminal 24 may provide a ground connection, a second terminal 26 may provide a 12V output, and a third terminal 30 may provide a 48V output. As illustrated, the 48V output of the battery module 22 may be coupled to a BAS 29, which may be used to start the ICE 33 during start-stop cycle, and the 12 V output of the battery module 22 may be coupled to a traditional ignition system (e.g., starter motor 28) to start the ICE 33 during instances when the BAS 29 is not used to do so. It should also be understood that the BAS 29 may also capture energy from a regenerative braking system or the like (not shown) to recharge the battery module 22.

It should be appreciated that the 48 V and 12 V outputs of the battery module 22 may also be provided to other components of the mHEV 10. Examples of components that may utilize the 48 V output in accordance with present embodiments include radiator cooling fans, climate control fans, electric power steering systems, active suspension systems, electric air-conditioning systems, auto park systems, cooled seats, electric oil pumps, electric super/turbochargers, electric water pumps, heated seats, heated windscreen/defrosters, and engine ignitions. Examples of components that may utilize the 12 V output in accordance with present embodiments include window lift motors, vanity lights, tire pressure monitoring systems, sunroof motor controls, power seats, alarm systems, infotainment online features, navigation features, lane departure warning systems, electric parking brakes, and external lights. The examples set forth above are not exhaustive and there may be overlap between the listed examples. Indeed, for example, in some embodiments, features listed above as being associated with a 48 V load may utilize the 12 V output instead and vice versa.

In the illustrated embodiment, the 48 V output of the battery module 22 may be used to power one or more accessories of the mHEV 10. For example, as illustrated in FIG. 4, the 48 V output of the battery module 22 may be coupled to the heating, ventilation, and air conditioning (HVAC) system 32 (e.g., including compressors, heating coils, fans, pumps, and so forth) of the mHEV 10 to enable the driver to control the temperature of the interior of the mHEV 10 during operation of the vehicle. This is particularly important in an mHEV 10 during idle periods when the ICE 33 is stopped and, thus, not providing any electrical power via engine charging. As also illustrated in FIG. 4, the 48 V output of the battery module 22 may be coupled to the vehicle console 34, which may include entertainment systems (e.g., radio, CD/DVD players, viewing screens, etc.), warning lights and indicators, controls for operating the mHEV 10, and so forth. Hence, it should be appreciated that the 48 V output may, in certain situations, provide a more efficient voltage at which to operate the accessories of the mHEV 10 (e.g., compared to 12 V), especially when the ICE 33 is stopped (e.g., during start-stop cycles). It should also be appreciated that, in certain embodiments, the 48 V output of the battery module 22 may also be provided to any other suitable components and/or accessories (e.g., lights, switches, door locks, window motors, windshield wipers, and so forth) of the mHEV 10.

Also, the mHEV 10 illustrated in FIG. 4 includes a vehicle control unit/module (VCM) 36 that may control one or more operational parameters of the various components of the vehicle 10, and the VCM 36 may include at least one memory and at least one processor programmed to perform such tasks. Like other components of the mHEV 10, the battery module 22 may be coupled to the VCM 36 via one or more communication lines 38, such that the VCM 36 may receive input from the battery module 22, and more specifically, the battery control module (BCM) of the battery module 22 (discussed in detail below). For example, the VCM 36 may receive input from the battery module 22 regarding various parameters, such as state of charge and temperature, and the VCM 36 may use these inputs to determine when to charge and/or discharge the battery module 22, when to discontinue charging the battery module 22, when to start and stop the ICE 33 of the mHEV 10, whether to use the BAS 29 or the starter 28, and so forth.

As stated above, in micro-hybrid, mild-hybrid, and hybrid-electric vehicles, various states of an energy storage device that may be one of a plurality of storage devices of an energy storage system (ESS) need to be measured or estimated to maintain proper function, including electrical propulsion, brake regeneration, and other functions. As an example of an ESS state, the SOC indicates a current/present capacity expressed in terms of its rated capacity that a cell has for providing or receiving energy, and is one of the parameters that are required to ensure safe charging and discharging of cells of a battery module/pack. As such, SOC provides the current state of cells and enables cells to be safely charged and discharged at a level suitable for cell and battery pack life enhancement. Thus, SOC helps in the management of cells and battery packs. Furthermore, because SOC is based on deriving the level of charge from the measured cell voltage and temperature parameters, rechargeable cells may exhibit varying discharge characteristics with time and temperature.

As known, the SOC is normally measured as a percent of the energy storage device (i.e., cell or battery pack) capacity with a fully charged energy storage device being 100% and fully discharged being 0%. The definition of fully charged/discharged is dependent on the chemistry and application of the energy storage device. The reference of the SOC can be expressed relative to the rated capacity of the energy storage device, so if an energy storage device has a SOC of 100% it is at full rated capacity of the energy storage device. The actual capacity of the energy storage device is known to deteriorate over time, with the maximum capacity and power input/output of the energy storage device decreasing over time as the chemistry and internal properties of the energy storage device deteriorate.

It is known to control power networks in vehicles based on an estimated condition of the energy storage device in order to optimize use of power, manage the useful life of the energy storage device, and increase fuel economy of the vehicle. With better estimation it may be come possible for a reduction in cost by downsizing the size of the batteries. Unfortunately, existing schemes for doing so suffer from an inability to obtain accurate information concerning the status of the energy storage devices. Highly accurate estimates of a state of an energy storage device, such as state of charge (SOC), state of health (SOH), capacity, or resistance, can only be made infrequently and indirectly, when the energy storage device is at rest and energy is not being drawn from it.

Opportunities to make measurements while the batteries are at rest are rare while the vehicle is in operation. Since the high accuracy measurements of a state of an energy storage device are made infrequently, any stored estimation of a state of an energy storage device increases in inaccuracy during the time since the last accurate measurement. Since many energy storage devices, like batteries, operate best under well-controlled conditions, it is important that the state of an energy storage device is accurately known and that the energy storage device is kept operating within an acceptable range of conditions. One approach to address this problem is to "top charge" certain types of batteries such that the batteries are fully charged. This approach is inefficient and provides little room for future charging. Another approach has been to accept that measured or estimated states of the batteries are inaccurate and simply provide a wide margin for operational error. Unfortunately, this approach is also costly.

Accordingly, the present approach is directed to a power control system that performs a battery use strategy that facilitates battery state estimation during operation of a vehicle. These estimates are performed during rest periods of the battery, which correspond to a current level of the battery that enables an evaluation/estimation of the SOC. In one embodiment, a sensor connected to an energy storage device is used to measure a state of the energy storage device during a rest period, which corresponds to a time span during which a current through the energy storage device is reduced to a level that enables an estimation of a state, such as resistance, capacity, open circuit voltage (OCV), state of charge (SOC), and state of health (SOH).

In one embodiment, this estimation enabling current level may be equal to or near zero. This battery use strategy is configured to ensure that the battery has regular or selectively established rest periods during a driving mode of the vehicle to facilitate state estimation. The rest points are established by optimizing against two criteria: 1) minimizing disruption to the otherwise optimal strategy and 2) urgency of the need to perform state estimation activity. In one embodiment, the rest points strategy is further configured to optimize a duration of the rest events versus a frequency of the rest events. Thus, this strategy establishes suitable time periods of rest events that enable a decrease in the scheduling of these rest events. In case of a multiple energy storage system, the rest points are selected for one energy storage device/component while the remaining energy storage device(s), and/or another power generation device (such as a generator), can continue to handle and support any or all vehicle load requirements.

Instances of state estimation can include SOC, remaining capacity, resistance, degradation, and charge imbalance among cells in an energy storage device or energy storage devices in the ESS, among other states. The rest period may also provide opportunity to alleviate any problems, such as imbalance, that may be discovered during the rest period. Alternatively, these problems may be solved during a future rest period.

In accordance with the present disclosure, the SOC is specifically determined by comparing a predicted voltage of the battery during the rest period to a known relationship between the open-circuit voltage and SOC. As another aspect of the present disclosure, the relationship between open-circuit voltage and SOC may be established at multiple temperatures, and the temperature of the energy storage device may be used in the SOC estimate. Other variables and states may also be used to estimate SOC if these variables and states are known or found to be predictive of SOC. The ability to predict is true of other states as well.

Another instance of measurable battery state measurement may be achieved by determining the SOC by setting the OCV to the measured terminal voltage. The SOC is one of the measurable states, and the relationship between SOC and the OCV is deterministic. If the OCV is known then the SOC can be determined, and vice versa. Because OCV only equals terminal voltage for a relaxed battery, the OCV needs to be taken on a relaxed battery over sufficient time for accurate measurement.

Although illustrated as a car in FIGS. 1-4, the type of vehicle 10 may be implementation-specific, and, accordingly, may differ in other embodiments, all of which are intended to fall within the scope of the present disclosure. For example, vehicle 10 may be a truck, bus, industrial vehicle, motorcycle, recreational vehicle, boat, or any other type of vehicle. Where the vehicle has an internal combustion engine (ICE), it is located in an engine compartment located within the vehicle.

Figure 5:
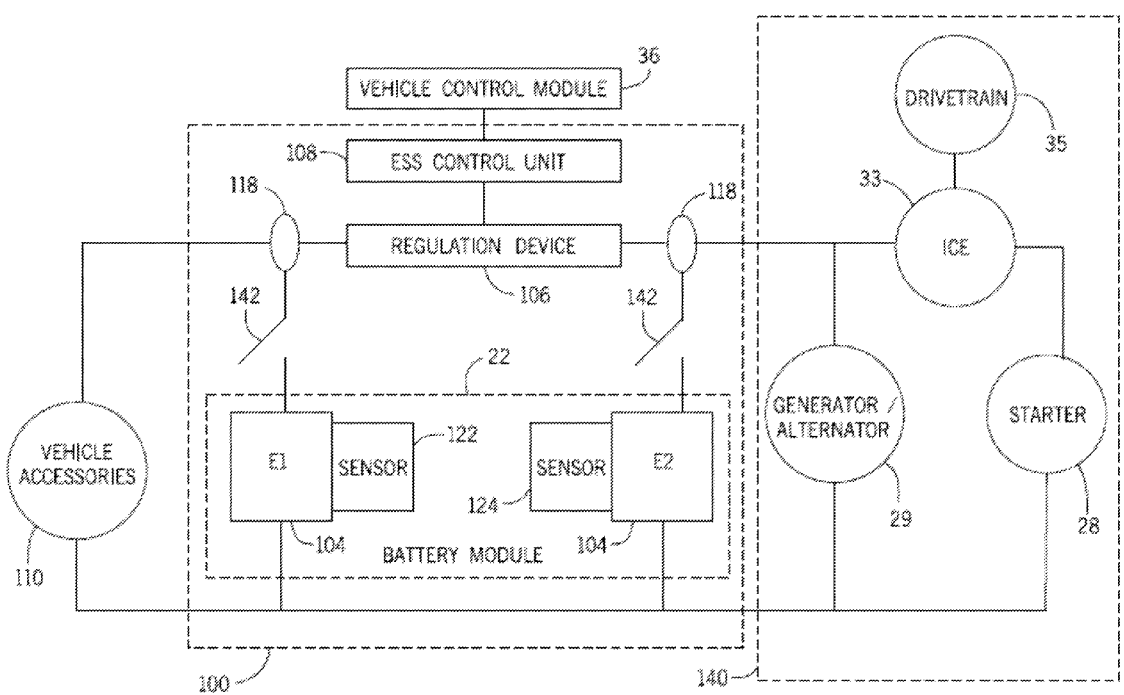
FIG. 5 is a block diagram illustrating components of the controlled energy storage system.

An exemplary embodiment of an ESS includes one or more energy storage devices and is configured for the application in a micro hybrid vehicle, which has functions such as start stop, and regeneration braking. As shown in FIG. 5, an ESS 100 includes a battery module 22 that includes couple of (dual) energy storage devices (E1) 102 and (E2) 104, a voltage/current/power flow regulation device 106 and an ESS controller or control unit 108. In one embodiment, regulation device 106 may be a DC/DC converter unit. As shown, energy storage device 102 is connected to electrical accessories 110, and energy storage device 104 is connected to a starter unit 28 and a generator/alternator unit 29. As stated above, starter unit 28 and generator/alternator unit 29 can be combined into an integrated starter-generator that provides both starter and generator functions.

As shown, starter unit 28 and generator/alternator are coupled to ICE 33, which is in turn coupled to a drivetrain 35. Alternatively, electrical accessories 110 may be positioned between energy storage device 102 and regulation device 106. Moreover, electrical accessories 110 and energy storage device 102 may be positioned on opposite sides of regulation device 106. These different positions of energy storage device 102 within ESS 100 can support different voltages of energy storage device 102 to meet different power requirements of electrical accessories 110. In addition, based on power demands of generator/alternator 29, both storage devices 102 and 104 can be connected to generator/alternator 29, and their respective power flows can be controlled individually by regulation device 206. In one embodiment, energy storage device 102 may have characteristics that render it suitable for high current operation under high power conditions, such as during starting and regenerating events.

In one embodiment, energy storage devices 102 and 104 can both be located on one side of regulation device 106. That is, energy storage devices 102 and 104 may be located between electrical accessories 110 and regulation device 106 or between generator/alternator 29 and regulation device 106. Alternatively, ESS 100, implementable in any electrical vehicle, may be a multiple battery system configured to support high power loads and provide power redundancy.

Still referring to FIG. 5, vehicle 10 may include one or more vehicle control units, such as VCM 36, which may provide input data to ESS 100 that is used to assist in making decisions with respect to estimations of the measurable states of the one or more energy storage devices. As discussed above, electrical accessories 110 can include a plurality of accessories (power consuming loads) that are associated with a power network load, which can vary over time depending upon what different accessories and other devices are being powered from time to time. The power network load receives electrical power provided by ESS 100 through a power network 250 shown in FIG. 6, such as a vehicle power network.

In one embodiment, E1 100 can be a battery, capacitor, and an energy storage device of any type. Different types of batteries may be used, such as lead acid, lithium-ion, NiMH, zinc-bromine, lithium-sulfur, flow batteries, polyvalent batteries and metal-air batteries and other types of batteries. Likewise, different types of capacitors may be used, such as electrolytic, electric double layer capacitors (EDLC), lithium capacitor, pseudo-capacitors, asymmetric capacitors, ultra-capacitors, or other types of capacitors.

In accordance with the present disclosure, E1 102 and E2 204 are selectively controlled by ESS controller 108, in accordance with measurable state information obtained through a data network linking ESS controller 108 to E1 102 and E2 104. ESS controller 108, based on information received from VCM 36 and other stored parameters, is configured to selectively command regulation device 106 to cause a disconnection of one of energy storage devices E1 102 and E2 104 from the power network.

The use of term "disconnect" with reference to energy storage devices E1 102 and E2 104 does not necessarily refer to a physical disconnection. Rather, when energy storage devices E1 102 and E2 104 are disconnected, it simply means that they cease supplying more than zero, near-zero or approximately zero current to or from the power network. In accordance with the present disclosure, this disconnection is made to reduce the current passing through E1 102 and/or E2 104 to near-zero or approximately zero. This "disconnection" can be accomplished via a reduction in power output setpoint, an actual physical disconnection (e.g., via a switch), or other means.

Approximately or near-zero should be understood to mean exactly zero or sufficiently close to zero to be able to accurately take a measurement of the state of the energy storage device. The exact value of the approximately or near-zero current will depend heavily on the nature of the energy storage device and the particular state of the energy storage device measured and may need to be determined empirically. In one embodiment, approximately or near-zero is preferably from zero to five amperes of current, and most preferably, from zero to one hundred milliamperes of current. In any event approximately or near-zero current is at whatever low level as is needed to enhance determinations of the measurable state of energy storage devices E1 102 and E2 104.

Whether a current is sufficiently low depends upon the nature and type of the battery or other energy storage device and the particular measurable state that is desired to be measured. As noted above, in many cases this current may be on the order of approximately one-hundred milliamperes but may be as high as five amperes or possibly more. While the terms near-zero or approximately zero are intended to include exactly zero, exactly zero current is not always easily obtained, but near-zero current is preferably as close to zero as practicable.

As used in this application, the measurable state of one of energy storage devices E1 102 and E2 104 may include the storage device conditions of: temperature, voltage, capacitance, polarization, age, resistance, health, remaining life, charge and any other battery parameters that may be measured. These conditions are provided by condition sensors 122 and 124 associated with energy storage devices E1 102 and E2 104, respectively, which are appropriate to the particular condition being sensed. Condition sensors 122 and 124 can be connected directly or indirectly to energy storage devices E1 102 and E2 104, respectively.

As stated above, vehicle 10 has ICE 33, and ESS 100 is coupled to a power producing system 140, which includes starter unit 29 and generator/alternator 28. During operation, power producing system 140 is configured to charge energy storage devices E1 102 and E2 104. In one embodiment, power producing system 140 includes the means to produce regenerative braking via the alternator, generator, or similar device, as well as optional renewable energy generating devices, e.g., a solar panel (not shown).

In addition, power producing system 140 includes sensors (not shown) that determine the condition of the power producing units, such as temperature, RPM, power output and the like. The status, or condition, of the power producing units is passed from power producing system 140 to ESS controller 108, which is configured to utilize this information to make determinations when it is best to make a battery state measurement of one of or both of energy storage devices E1 102 and E2 104.

This determination is preferably done using an optimization procedure described below to minimize disruption of normal operation of vehicle 10 when the currents flowing through energy storage devices E1 102 and E2 104 are set to near-zero. In addition, operation of the power producing system 140 is controlled by VCM 36 based on control signals sent from ESS controller 108.

In addition to energy storage devices E1 102 and E2 104, there may be one or more other energy storage units (not shown), which may be the same type or a type different from one of energy storage devices E1 102 and E2 104.

Referring back to FIG. 5, ESS 100 includes controlled switching units 142 and 144 coupled to energy storage devices 102 and 104, respectively, which are selectively actuated by ESS controller 108 to connect the associated energy storage device 102 or 104 to the power network and thus to any other storage device connected to the power network, to the power producing system 140 and to vehicle accessories 110. Again, it should be appreciated that the term "controlled switch unit" is intended to include any controllable electronic device in which the current through the device may be controlled by provision of control signals to a control input of the device, which may or may not be a conventional electronic switch, such as triac or the like. When energy storage device 102 or 104 is connected to the network through controlled switch unit 142 or 144, charging current may be received through the power network and the respective controlled switch. Also, when energy storage device 102 is connected to the power network, discharging or charging current may be drawn from energy storage device 104 connected to the power network through controlled switch unit 144. Each of controlled switch units 142 and 144 should be understood to be any electrical device capable of controlling electrical current flows. When energy storage device 102 or 104 is disconnected from the power network by opening of the respective controlled switch unit 142 or 144, any charging or discharging current through energy storage device 102 or 104 is terminated and has a value of zero or near-zero.

In accordance with one important aspect of the present disclosure, it is during these intentionally created intermittent approximately or near-zero current periods, that state measurements are made by one or more of the condition sensors 122 and 124 connected with energy storage device 102 and 104, respectively, and communicated to ESS controller 108. Condition sensors 122 and 124 may, but do not necessarily include, sensors for determining voltage, temperature, capacitance, current that may be directly measured to produce an estimation of the state of charge, polarization, resistance or other characteristics.

Figure 7:
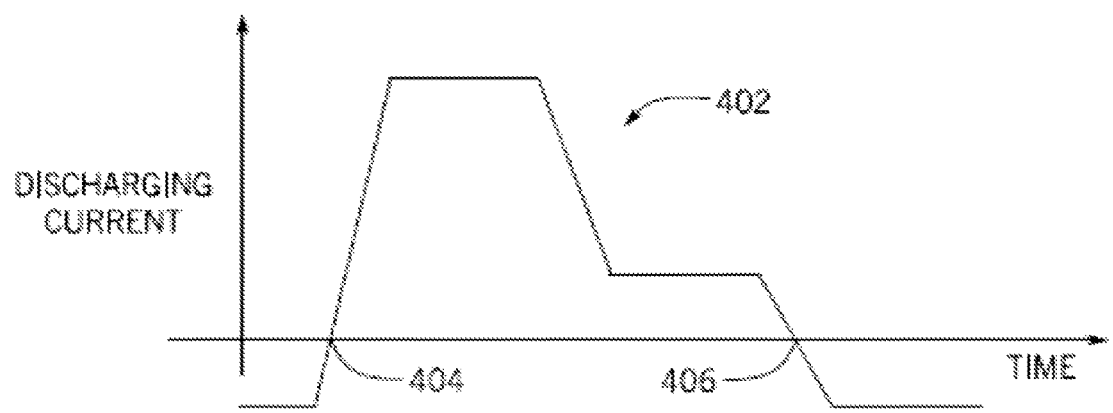
FIG. 7 is an exemplary graph of the charging and discharging of an energy storage device, such as a battery, in a conventional PRIOR ART power system.

Now referring to FIG. 7, in the case of known PRIOR ART systems, while the battery charging and discharging current 402 does pass through zero periods 404 and 406, times of near-zero current are too short, too infrequent or both too short and too infrequent to optimize the making of measurable battery state measurements that can only be optimized by longer periods of approximately or near-zero current.

The zero points encountered in conventional battery operation as shown in FIG. 7 are merely incidental to the battery or other energy storage devices rate of transitioning from a charging condition to a discharging condition and vice versa. They are not planned or artificially induced for the purpose of increasing the estimated accuracy of an internal battery state. Moreover, the time period of near-zero current is often inadequate for taking accurate state measurements. For instance, in the case of a battery, if the state of charge of is desired to be determined, the battery ideally would be allowed to rest for many minutes before being measured. However, normally such a long period of rest would be too disruptive to the normal operation of the vehicle. In accordance with the present disclosure, a rest period is selected to be less than the ideal but of sufficient duration, so that the relaxation condition can be projected to estimate what the measured state would be, if there were full relaxation. Depending on the battery in question, a time rest of approximately one minute may be sufficient to estimate the state of charge. The small duration of the time that the current is zero or near-zero is merely a characteristic of the storage device is question, and the particular times when the zero cross-over points occur may be too seldom for an optimum rate of periodic monitoring.

Figure 8:
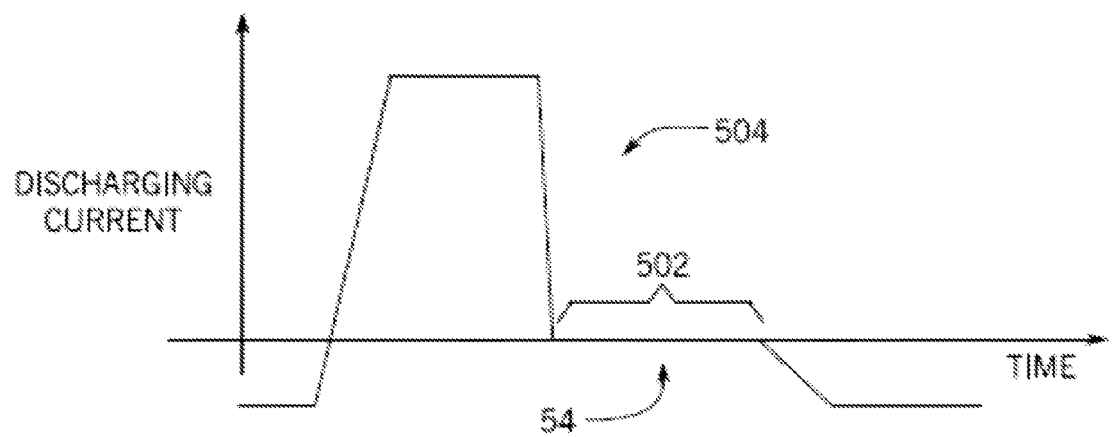
FIG. 8 is an exemplary graph of the charging and discharging of an energy storage device, such as a battery, in the controlled energy storage power system.

On the other hand, as seen in FIG. 8, in accordance with the present disclosure, ESS controller 108 is configured to establish preselected energy storage device planned rest periods 502. The duration of planned rest periods 502 may have a certain expectation of completing a preselected desired length of time or time duration during which the current 504 passing through the energy storage device is substantially or near zero. However, at any point during the planned rest period 502 of preselected desired energy storage device, a vehicle demand could cause interruption of the intended length of the planned rest period. An estimate is made of an expected opportunity for an approximate period of time. However, the actual duration of the planned rest period ends 502 when the disruption to the operation of the vehicle caused by the planned rest period exceeds the need for incremental accuracy in measurement. The determination of when or whether the planned rest periods 502 end is continuously evaluated during a rest period. When the rest period ends, whatever data was collected before the end of the planned rest period is used to define a new estimate of the measurable state of the energy storage device and the confidence of that state estimate is also determined. The data can be data associated states of the energy storage device (i.e., battery data), data associated with states of operation of the vehicle (i.e., vehicle data external to the energy storage device), or environmental data. If the confidence of the new estimate is greater than that of the older estimate, the state estimate is updated. If not, the older estimate is retained.

Figure 6:
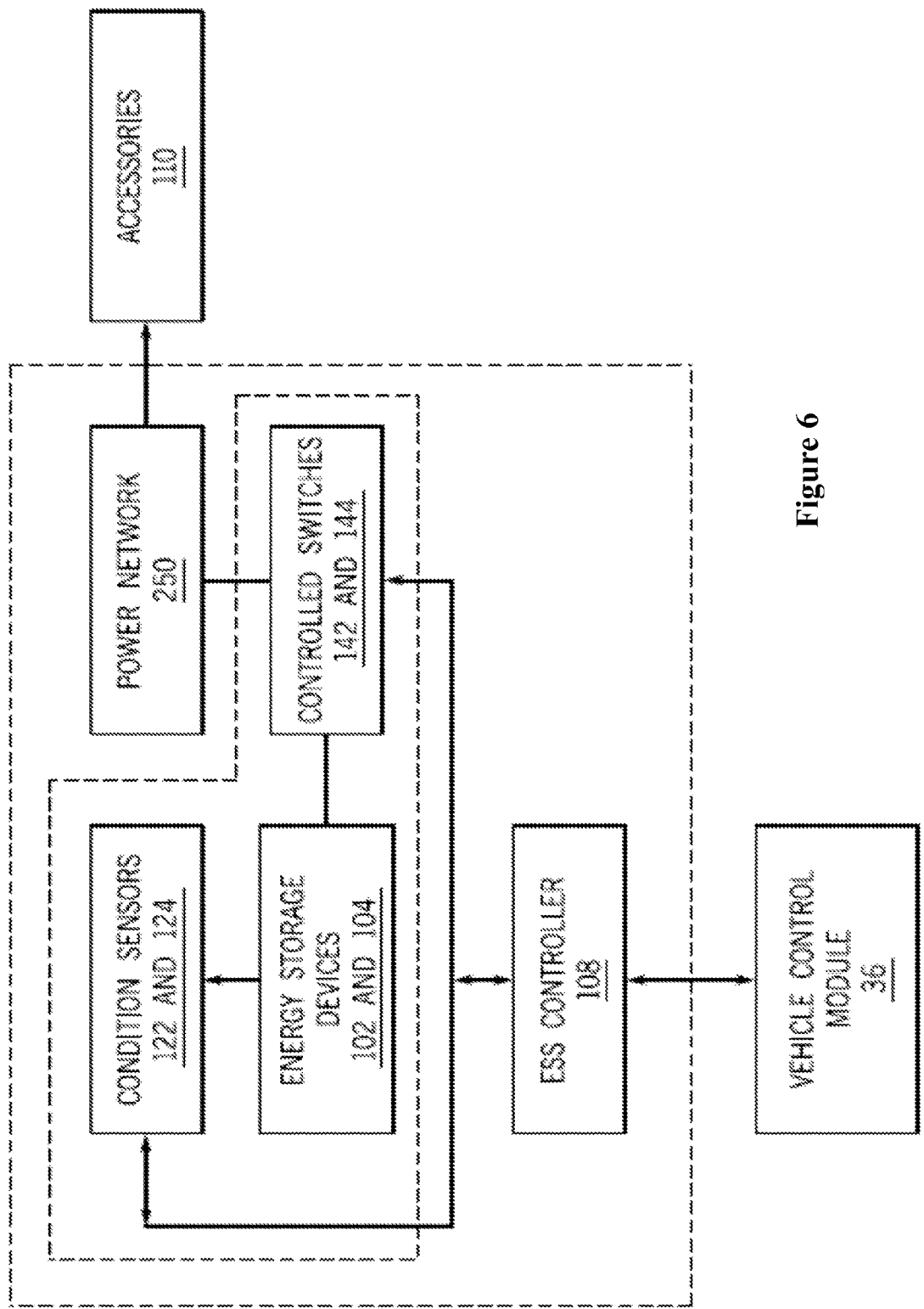
FIG. 6 is a functional block diagram of elements of the energy storage devices shown in FIG. 5.

Though, these rest periods 54 are planned and not merely incidental to the battery passing between a discharging condition to a charging condition in the course of normal operation. Instead they are artificially imposed. Moreover, rest periods 54 can have an intended time duration that is specifically selected to be sufficiently long to facilitate and enable various state measurements by the condition sensors 122 and 124, if the time preselected time duration of a planned rest period actually occurs and is not prematurely ended due to power demands by vehicle 10. These relatively lengthy rest periods 54 of substantially near-zero current can be at least tens of seconds long, and from ten seconds to over one minute, depending upon what particular state measurement is being made and whatever other demands are being made on vehicle 10. On the other hand the zero crossing points during standard operation of an energy storage device shown in FIG. 6 are typically of a much shorter duration than needed for accurate estimates of the state of the energy storage device. The order of charging and discharging events during driving operation will provide natural opportunities for defining rest events for the battery. For instance, during coasting, an alternator might be used to support electrical loads while the battery is set to near-zero current. Alternatively, in accordance with one embodiment, for a dual energy storage system, one energy storage system might be shut off while the other battery is charged during regenerative braking.

Typically, during rest periods voltage readings are collected to correlate the SOC of the energy storage device. However, the time for the voltage level of the energy storage device to settle may be longer than desired. As stated above, some operational modes of vehicle 10 may not provide the opportunity for such a period of rest to allow the state of charge to settle. In some instances, it may be acceptable to reduce accuracy for the benefit of shortening the time requirement for the measurement. For example, in some instances a full relaxation may not reached even after a period of several minutes, but a shorter period may enable acquisition of data that allow the determination of model parameters, which, in turn, allows the prediction of the remaining relaxation profile with sufficient accuracy.

Figure 9:
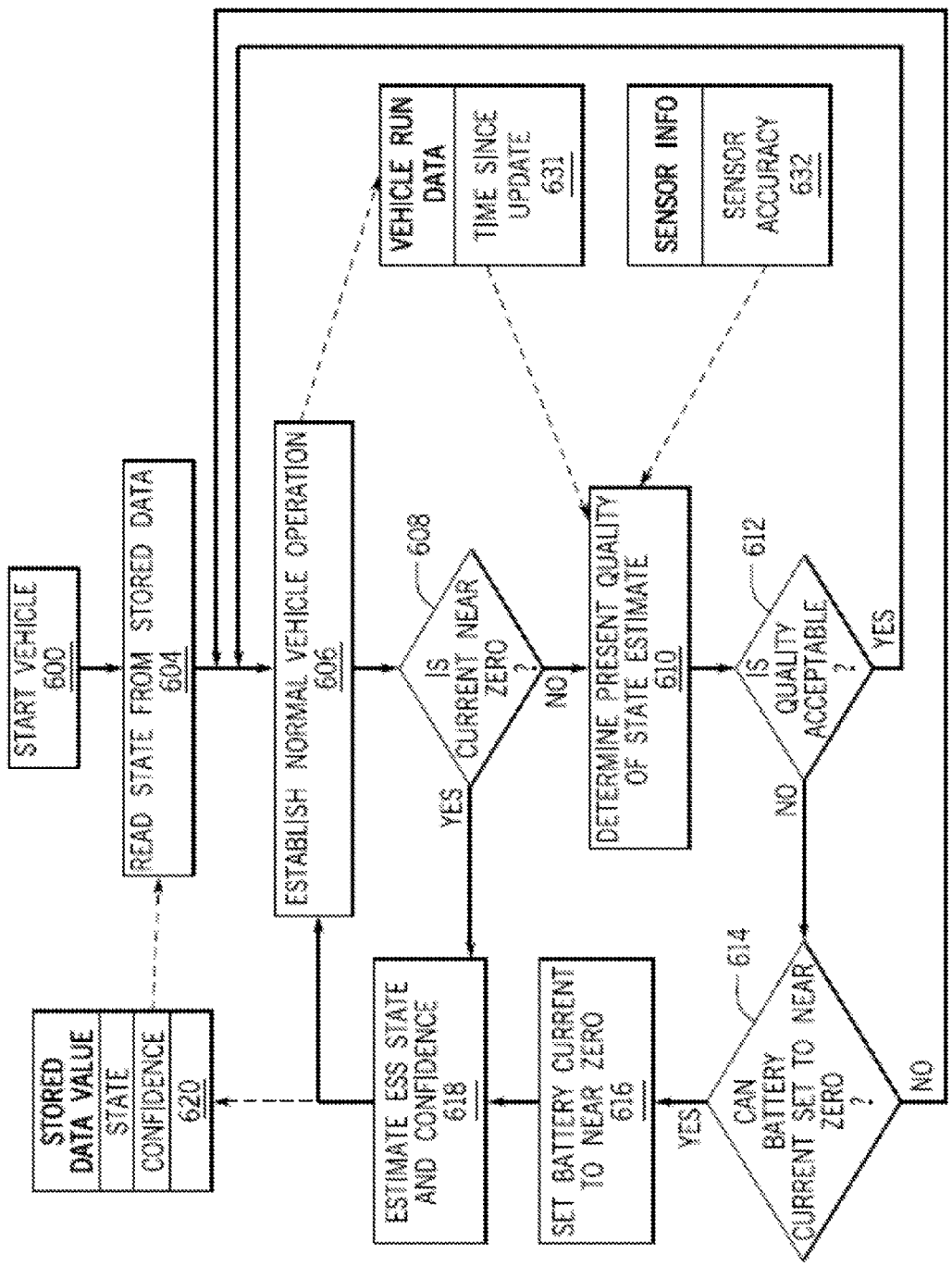
FIG. 9 is a flow chart of an embodiment of a battery use strategy performed a controller.

Now referring to FIG. 9, in one embodiment a flow of operation of ESS 100, or program, may begin when vehicle 10 being powered at least in part by ESS 100 is started at Step 600. During prior operation of vehicle 100, ESS controller 108 stores the last or most recent measured state of each of energy storage devices 102 and 104 and the associated level of confidence of each measurement in a nonvolatile memory unit 620. Once vehicle 10 is started again, this last stored state measurement and confidence level is retrieved/read by a processing unit of ESS controller 108, at Step 604.

ESS controller 108 is then configured to support normal vehicle operation, at Step 606, and the time since the last state measurement was made for each energy storage unit is determined from the states of associated clocks (not shown) of ESS controller 108. At Step 608, ESS controller 108 is configured to determine whether the current of any particular energy storage device is near-zero. If the current is already near zero, then one or more ESS states and their confidences may be estimated in Step 618. Assuming the negative from Step 608, then, at Step 610, an estimate of the current quality of, or confidence in, the last stored measurable battery state determination is made based in part on vehicle run data 631 from associated clocks. In addition, the inherent level of accuracy of condition sensors 122 and 124 for the particular conditions being sensed may be pre-stored in a sensor info unit 632 of ESS controller 108. In such case, a sensor accuracy level is used in combination with the time of last measurement information to calculate the present quality or level of confidence in the last state measurement. The accuracy information could be gained from sensor specifications from the manufacturer. Alternatively, ESS controller 108 could automatically read sensor accuracy level from data carried by the sensors to insure accuracy.

Next, at Step 612, based on the calculation made at Step 610, a determination is made as to whether the quality of, or confidence level in, the last measurable battery state measurement is acceptable. This determination is made for each of energy storage devices 202 and 204 based on a comparison of the previous level of confidence that is stored in the ESS controller 208. This minimum level of confidence is empirically determined for an optimum result.

If the quality level is acceptable, ESS controller 108 is configured to repeat the above cycle, which starts at Step 606. If the quality is not acceptable, at Step 614, ESS controller 108 is configured to determine whether, based on a number of factors discussed below, a rest period of near-zero current for the energy storage unit in question should be established. In the negative, ESS controller 108 is configured to cycle back to Step 606. In the affirmative, ESS controller 208 is configured to determine that which of energy storage devices 102 and 104 may be set to zero, and to actuate the appropriate controlled switch 142 or 144 to disconnect the associated energy storage device 102 or 104 from the power network 250 to set the current to zero, at Step 616.

During this rest period of near-zero current, one or more measurements are made and a new estimate of the measurable state(s) of energy storage device 102 or 104 is made, at Step 618. At the same time, the new confidence level(s) in the new estimate(s) are determined. Generally, the confidence level in a new estimate will be highest immediately after the new estimate is made.

This new estimate and confidence level is then stored in sensor info unit 632 in lieu of the previous stored amounts, and ESS controller 108 proceeds to Step 606 and then Step 608. At Step 608, if the rest period is still being maintained and the current is near-zero, ESS controller 108 is configured to proceed to determine a new state measurement and a new confidence level, at Step 618, and sensor info unit 632 again is updated, at Step 620. This loop continues repeatedly with repeated updates being stored in sensor info unit 632 until the rest period ends and the current is no longer zero. ESS controller 108 is configured to continue with recalculating the time since the last update and determining the quality or confidence level in the last measurable state determination until, once again, a determination is made that the quality is not acceptable, at Step 612.

Calculating the measurable state and confidence level depends on characteristics of measurement. Different measurable states (e.g. state of charge and states of health, etc.) require different standards of measurement. Different types of measurement sensors for determining different measurable states may require the rest periods to be longer than others. Some measurable state determinations will produce a lower level of confidence when the rest period is shorter than optimum. On the other hand, some state measurements require more data to estimate than others do such that there is a variance in confidence level because of the different quantities of data.

For instance, state of charge requires a voltage measurement from a relaxed equilibrated voltage storage device. However, since the equilibration process takes many minutes in some cases, the relaxation process must be estimated based upon a number of factors: a projection of the equilibrated state from a trend of voltage versus time during relaxation or a known trend of relaxation versus time for specific combination of conditions.

The confidence level also depends on the nature of the energy storage device and its chemistry. The use pattern of the device that is predicted based on past experience also affects the expected quality of the measurement. With respect to chemistry, if the battery must be relaxed before an accurate measurement can be made, then the nature of the battery chemistry and its internal condition will determine how long the rest period should be for a given level of confidence. For instance, a capacitor might relax quickly allowing a measurement to be made quickly. Alternatively, a large battery with a high capacity might take many minutes. In addition, the duration of the measurement affects the quantity of data and the duration of the rest period. All the data is desirably stored regardless of however long the near-zero current rest period lasts. The duration affects the quality of the estimate because measurable battery state data of measurable state is collected as state versus time, such as voltage versus time. The trend of change over time is then fitted and extrapolated to an asymptote at the relaxed state. More data allow a more accurate fit and a better estimate.

Other considerations with respect to establishing a confidence level is the quality of the measurement. How well the data fits to an electrochemical relaxation curve is highly dependent on the chemistry and impacts on the quality of the measurement. Noise in the data which can be due to sensor phenomenology, for example, can also have an effect.

With regard to Step 610 of FIG. 9, the quality of the estimated state measurement may be determined by considering multiple pieces of information. Increasing the time passed since the last measurement results in reducing the level of confidence in the estimated measurable state. The quality of the latest update is dependent on many factors including sensor information concerning the quality of the sensors being employed, the chemistry, duration of rest and the fit of the data to the model. The higher quality current sensors introduce less error and, thus, provide an improved level of confidence in the accuracy of the estimated measurable state.

The quality of the last measurement also depends upon the ability of the system to determine the measured state during near-zero or zero current. This ability depends upon the nature of the state being measured. For example, if the SOC is to be determined, then accuracy of the estimated state measurement depends upon both the accuracy of the voltage measurement and the slope of the open circuit voltage (OCV) versus the state of charge (i.e. OCV vs. SOC) that is characteristic of the specific battery chemistry.

Determining when to perform a voltage reading depends on two factors which are symbolically represented as the decisions made at Steps 612 and 614 of FIG. 9. With respect to the question as to whether quality is acceptable, it has already been indicated that more time since the last update leads to reduce quality in the estimate, but measuring acceptable quality also includes other considerations. The sensitivity of the vehicle operation metrics (e.g. fuel mileage economy) against inaccuracies of the measure state should be considered. The quantitative metrics of estimate inaccuracy is also a factor. In addition, the expected benefit of performing a measurement based on the expected duration until the energy storage device can be set to zero and the duration of the expected rest period of near-zero current should be balanced against the duration of the event.

The determination, at Step 614 of FIG. 9, as to whether one of energy storage devices 102 and 104 can be set to near-zero current has an impact on vehicle operation. This depends upon present and predicted vehicle operational modes including the expected duration of time until zero-current is available and the duration of expected zero-current events and the like. Specifically, the decision to set the current to zero has an impact on fuel economy and other vehicle metrics, such as vehicle power, potential aging of the battery and other factors.

The two decisions of acceptable quality and whether the energy storage device current can be set to near-zero current can be optimized against each other by balancing these considerations. This may be done by optimizing a comparison of the impact on vehicle function by performing measurements instead of maintaining normal operation and the negative impact that poor quality estimates may have the energy storage devices successful continued operation.

Figure 10:
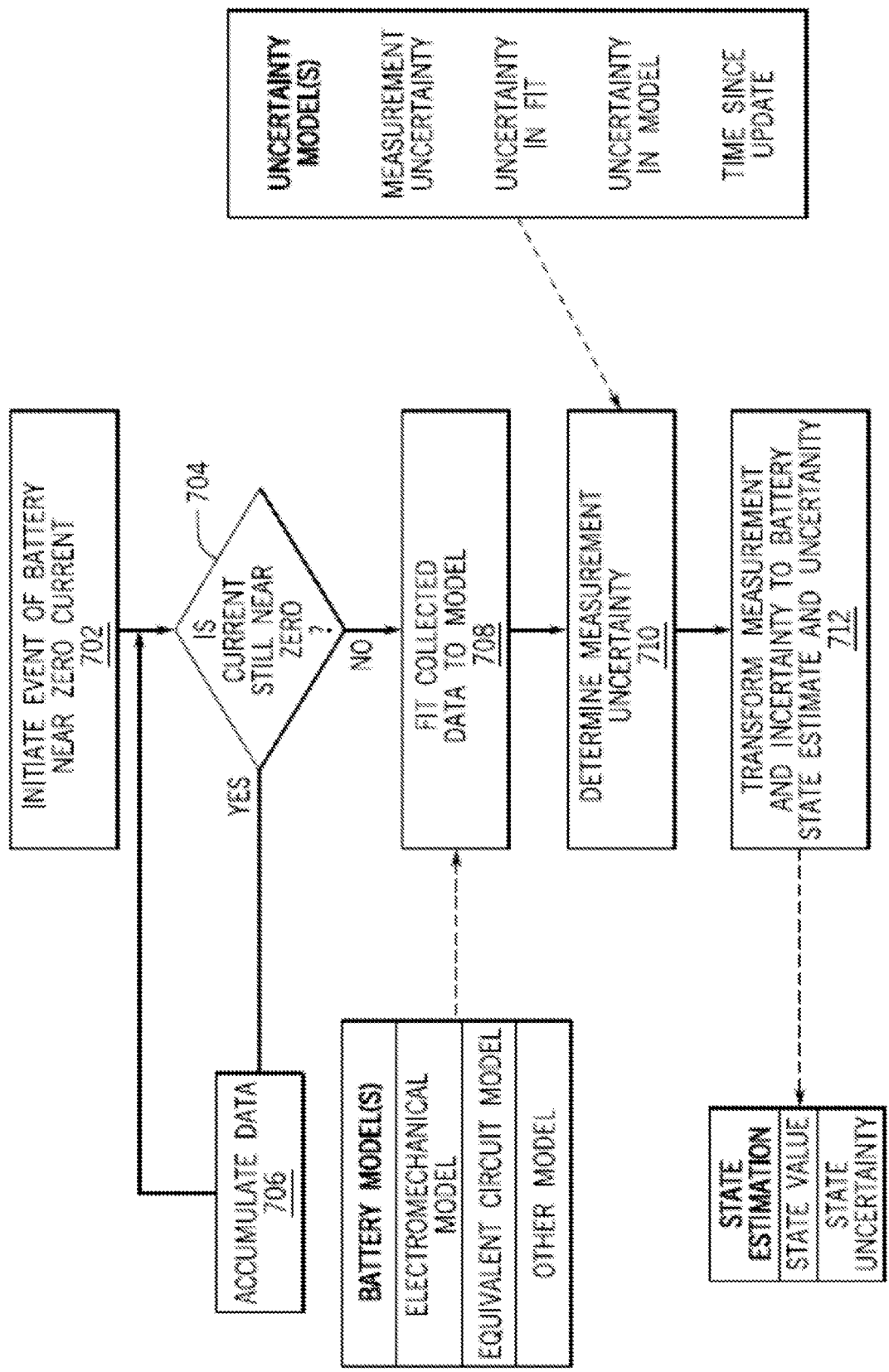
FIG. 10 is a flow chart of an embodiment of a process involving model fitting of an energy storage device when the current flow is not near zero.

This is preferably done by using an optimization process (method) like that shown in FIG. 10 to determine in real time whether to perform an optimization event. The optimization of one or more potential cost functions should be based on several considerations. Energy storage device lifetime, fuel economy, vehicle stability and passenger comfort should be considered. Also, the impact upon other components given optimization of a subset should be factor. For example, optimization of one energy storage device may increase the load requirements on other batteries or an alternator or the like.

Now referring to FIG. 10, in accordance with the proposed battery use strategy ESS controller 108 is configured to trigger/initiate a rest period (i.e., event of near zero current) of at least one of energy storage devices 102 and 104, at Step 702. ESS controller 108 then determines whether the current is still near or equal to zero, at Step 704. In the affirmative, ESS controller 108 keeps on accumulating data to determine the desired state of energy storage device 102 or 104, at Step 706. Otherwise, ESS controller 108 is configured to use the collected data while the current was near or equal to zero and any other data collected when the current was different from zero, to fit it in a battery model, at Step 708. The battery model can be one of an electrochemical model, an equivalent circuit model, or any other suitable model. Following the model fitting of the collected data, ESS controller 108 determines a measurement uncertainty using at least one of uncertainty models, which relate to measurement uncertainty, uncertainty in the model fitting, or any other source of uncertainty, at Step 710. Subsequently, ESS controller 108 uses the measured data and evaluated uncertainty to estimate a battery state value or level and a level of the state uncertainty, at Step 712.

Figure 11:
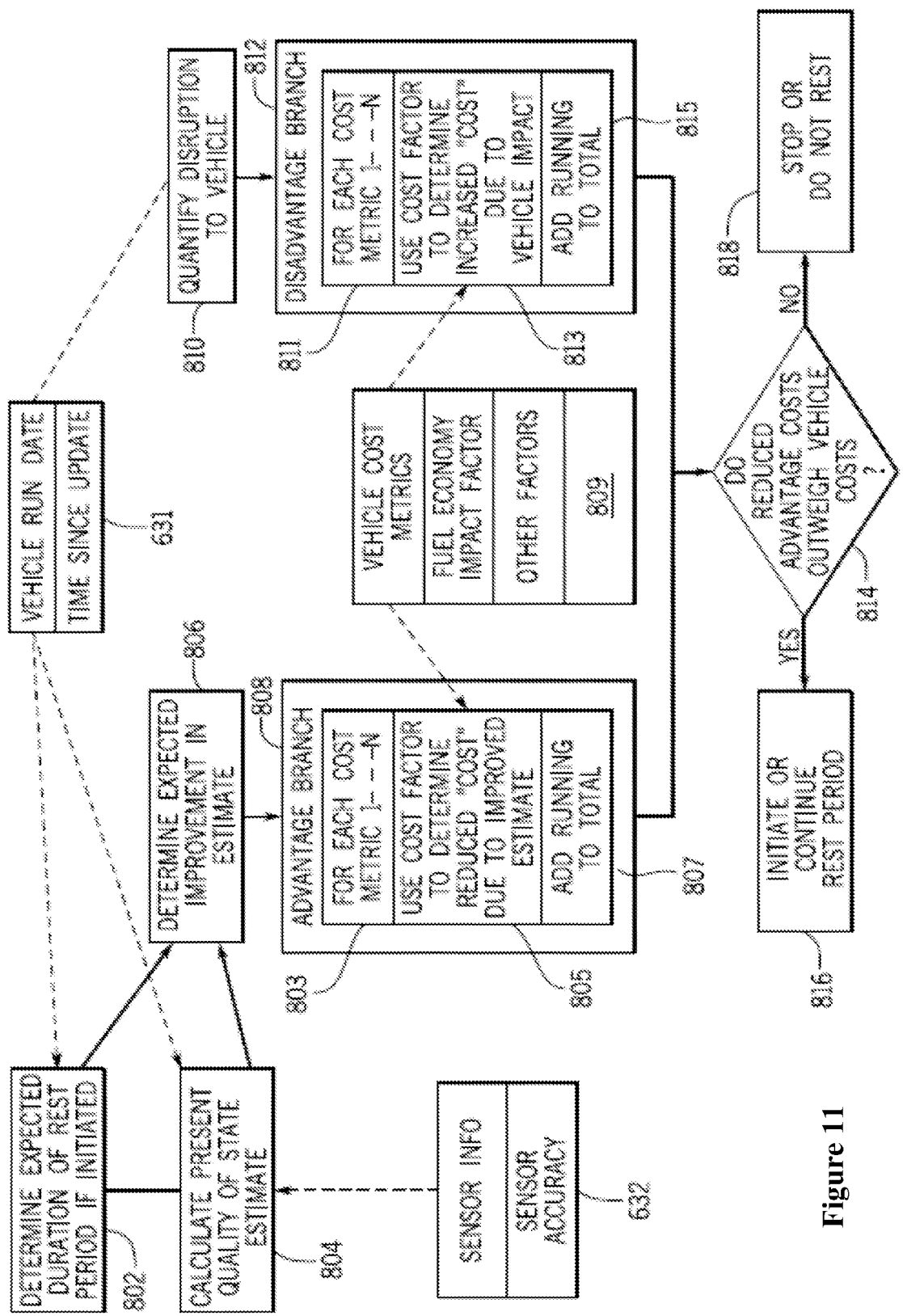
FIG. 11 is a flow chart of another embodiment of the battery use strategy performed by a controller, which optimizes the measurement quality acceptability and capability of setting energy storage device to near-zero current without undue disruption of normal vehicle operation.

Now referring to FIG. 11, the time since the last state measurement, or time since the last updated, is provided as vehicle run data 631 from the states of associated clocks 630 of ESS controller 108 for each of the energy storage devices 102 and 104. From this run data 631, at Step 802, a determination is made by the ESS controller 208 of the expected duration of a rest period, if one has been initiated. Also, the present quality of the measurable state estimate is made by ESS controller 108, at Step 804, that also received vehicle run data 631. The calculation, made at Step 804, of present state estimate quality is also based on sensor info unit 632, including sensor accuracy. The determination, at Steps 802 and 804, are used to determine the expected improvement in the estimate if a new measurement is made, at Step 806. This estimate is then passed to an advantage branch of the process, at Step 808.

Following Step 808, ESS controller 108 is configured to produce a cost metric for a measurement, at Step 803. At Step 805, ESS controller 108 then uses the cost factor to determine a reduced cost due to obtaining an improved estimate of the measured state, which then added to a running total, at Step 807. The cost factor is determined based on vehicle cost metrics 809 including fuel economy, an aging impact factor, and other potential factors.

On the other side of the determination to establish a planned rest period, at Step 810, ESS controller 108 quantifies (evaluates) a level of disruption to vehicle 10 that will occur due to a planned rest period being established. ESS controller 108 passes this quantification to a disadvantage branch of the process, at Step 812. During the disadvantage branch, ESS controller 108 determines each cost metric, at Step 811. Then at Step 813, ESS controller 108 uses the vehicle costs metrics from the vehicle cost metrics 809, and at Step 813, the increased cost due to vehicle impact is determined and this cost is added to a running total. The running total of the respective cost of causing a rest period are used, at Step 814, to determine whether the reduced advantage costs outweigh the increased vehicle cost. If the answer is affirmative, at Step 816, a planned rest period is initiated if one is not occurring, or is continued, if a planned rest period has already been started. If the decision is negative, at Step 818, the rest period is stopped if already begun and is not started if one has not already begun.

Figure 12:
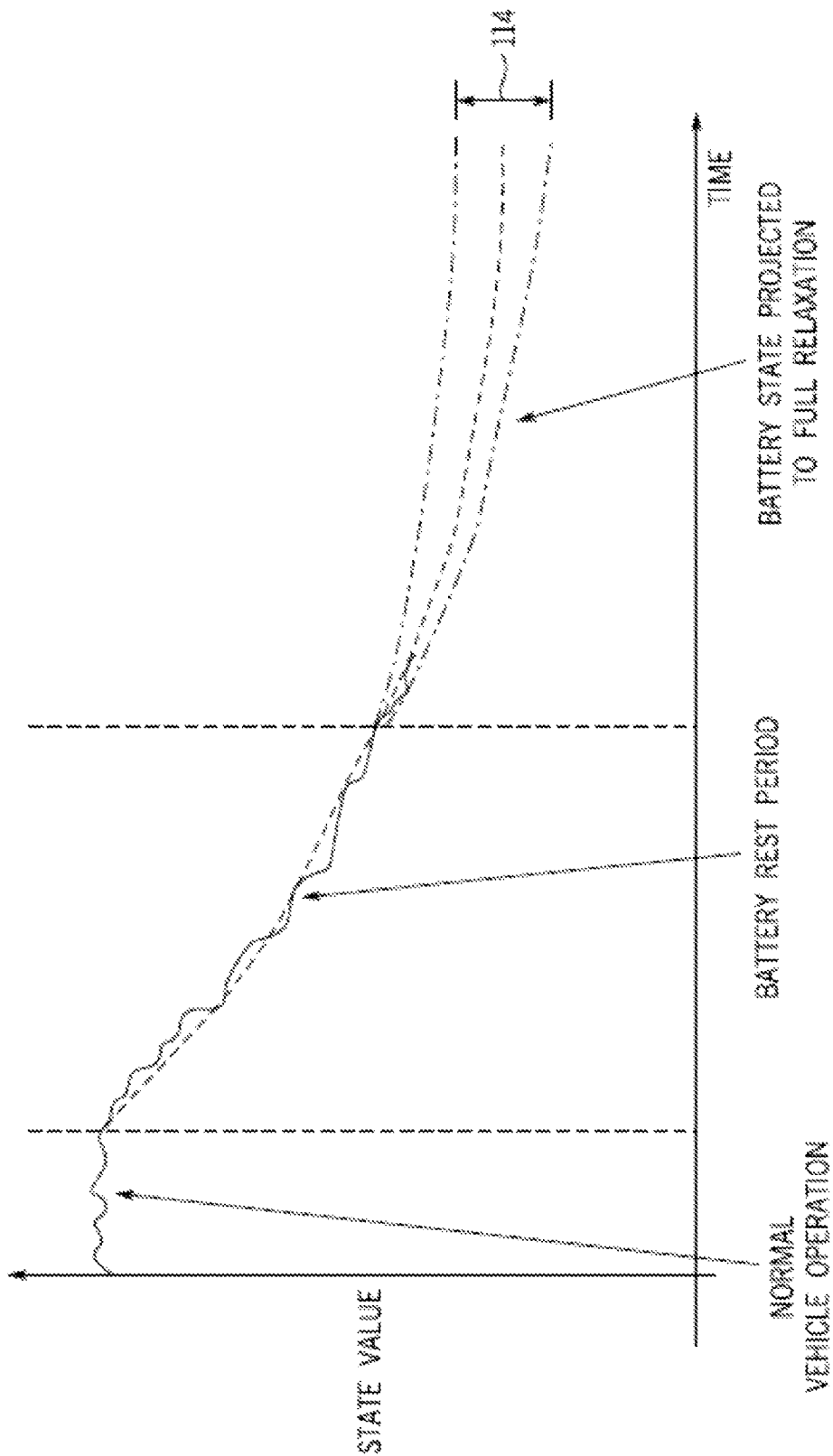
FIG. 12 is a graph illustrating how shorter rest periods lead to decreased accuracy of estimated state of the measurable state.

Referring now to FIG. 12, a graph is provided that illustrates the lessening of estimated measurable state as time passes after a state measurement during a rest period. An uncertainty in projection 114 is due to uncertainty of measurements (precision and accuracy), limited amounts of data and appropriateness of any model that may be used to fit the data.

In general, the stored use strategy of the present disclosure ensures that there will be occasional or regular rest periods established to facilitate state measurement activity during driving of vehicle 10. The timing of the rest periods will be chosen against the general criteria of minimizing disruption to the otherwise optimal or normal vehicle operation versus the urgency of a need to perform a measurable state determination as well as duration of rest periods versus the frequency of rest periods. In a hybrid vehicle, the rest periods may occur when ICE 33 can accept the load, via the alternator or generator. The rest period opportunity depends on the type of vehicle. For a dual-battery system, one battery can rest while the other accepts the load. In addition, measurable battery state measurement will include consideration of problems discovered as a result of state estimation, such as the need to perform battery cell balancing.

Figure 13:
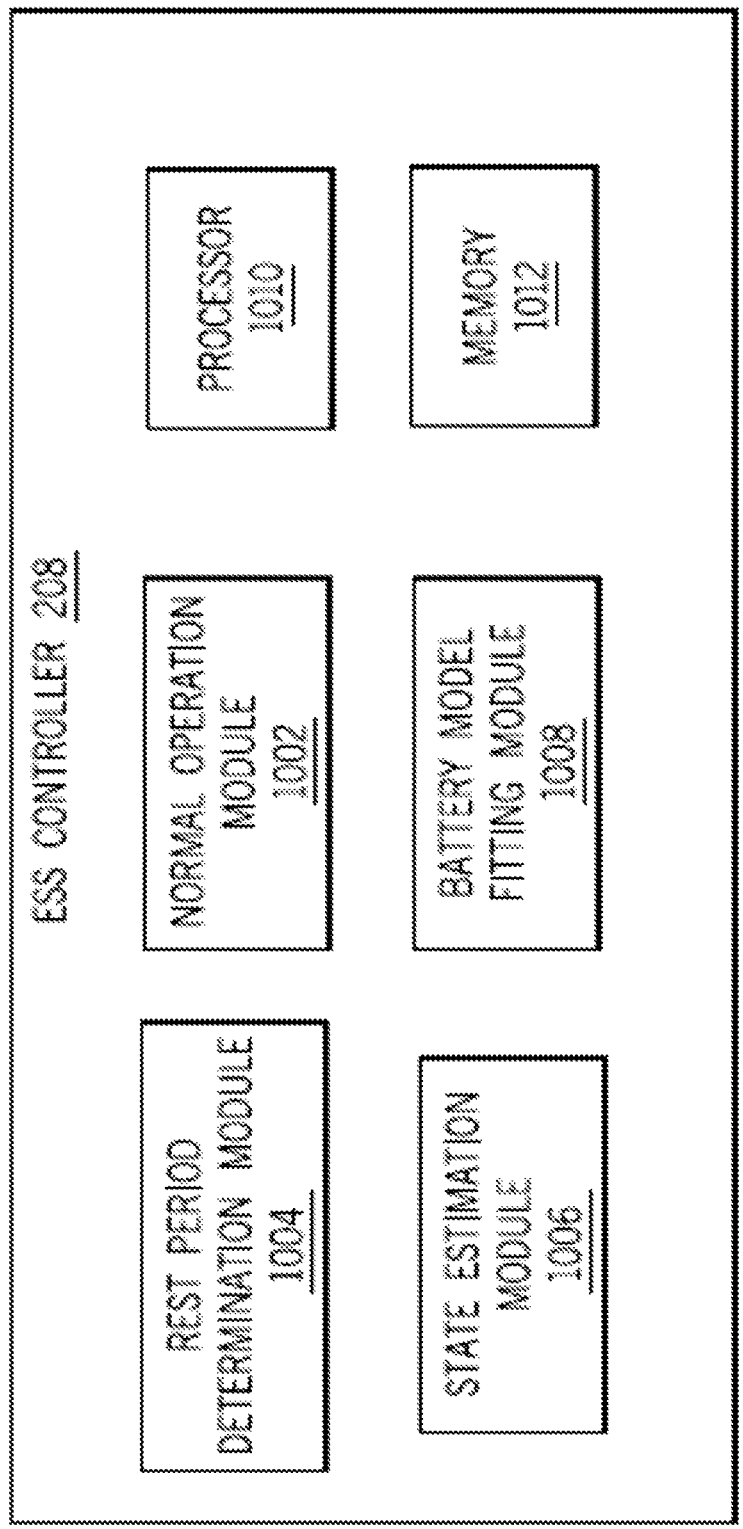
FIG. 13 is a block diagram illustrating components of an energy storage system controller.

As shown in FIG. 13, ESS controller 108 includes a normal operation program/module 1002, a rest period determination module 1004, a state estimation module 1006, and a battery model fitting module 1008. ESS controller 208 further includes a micro-processing unit 1010, and a memory unit 1012. Micro-processing unit 1010 can be implemented on a single-chip. For example, various architectures can be used including dedicated or embedded microprocessor (µP), a microcontroller (µC), or any combination thereof. Memory unit 1012 may be of any type of memory now known or later developed including but not limited to volatile memory (such as RAM), non-volatile memory (such as ROM, flash memory, etc.) or any combination thereof, which may store software that can be accessed and executed by the processing units, for example.

Figure 14:
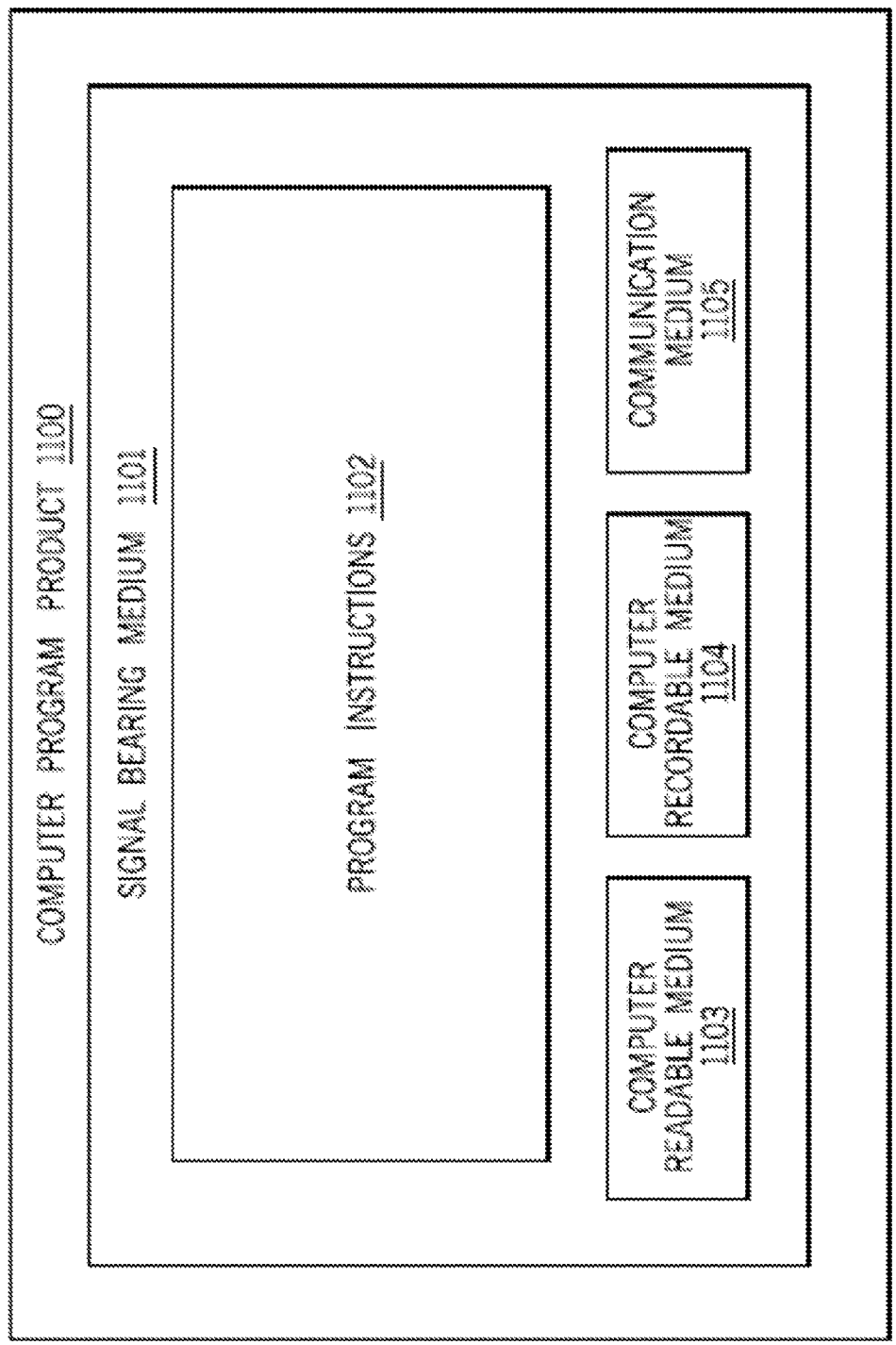
FIG. 14 is a schematic diagram illustrating a conceptual partial view of an example computer program product.

In some embodiments, the disclosed method may be implemented as computer program instructions encoded on a computer-readable storage media in a machine-readable format. FIG. 14 is a schematic illustrating a conceptual partial view of an example computer program product 1100 that includes a computer program for executing a computer process on a computing device, arranged according to at least some embodiments presented herein. In one embodiment, the example computer program product 1100 is provided using a signal bearing medium 1101. The signal bearing medium 1101 may include one or more programming instructions 1102 that, when executed by a processing unit may provide functionality or portions of the functionality described above with respect to FIGS. 1-12. Thus, for example, referring to the embodiment shown in FIGS. 9-11, one or more features of their respective steps, may be undertaken by one or more instructions associated with the signal bearing medium 1101.

In some examples, signal bearing medium 1101 may encompass a non-transitory computer-readable medium 1103, such as, but not limited to, a hard disk drive, memory, etc. In some implementations, the signal bearing medium 1101 may encompass a computer recordable medium 1104, such as, but not limited to, memory, read/write (R/W) CDs, R/W DVDs, etc. In some implementations, signal bearing medium 1101 may encompass a communications medium 1105, such as, but not limited to, a digital and/or an analog communication medium (e.g., a fiber optic cable, a waveguide, a wired communications link, etc.).

One or more of the disclosed embodiments, alone or in combination, may provide one or more technical effects useful in the controlling of energy storage systems in micro and mild hybrid vehicles. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system for providing power to a vehicle power network, comprising:
    an energy storage device connected to the power network;
    a sensor connected to the energy storage device for measuring a state of the energy storage device during a rest period, wherein the rest period corresponds to a time span during which a current through the energy storage device is reduced to a level that enables an estimation of a state of the energy storage device; and
    a controller that receives data from the sensor and estimates the state of the energy storage device based on data, wherein the controller establishes the rest period based on a comparison between a first cost metric associated with obtaining a new measurement of the energy storage device and a second cost metric associated with a disruption of normal vehicle operation during the rest period.

2. The system of claim 1, wherein the data is battery data.

3. The system of claim 1, wherein the data is vehicle data external to the battery.

4. The system of claim 1, wherein the current level that enables the state estimation is approximately zero.

5. The system of claim 1, further comprising:
an additional sensor configured to receive information about a condition of a power producing unit to the controller, wherein the controller utilizes the information from the power producing unit to establish additional rest periods when the power production unit can handle an increased load resulting from a disconnection of the energy storage device from the power network.

6. The system of claim 1, further comprising:
an additional energy storage device connected to the power network configured to provide additional current to the power network for operation of a power network load; and
an additional sensor that receives data from the sensor and measures a state of the additional energy storage device when the additional energy storage device has been disconnected from the power network by the controller to reduce stored electrical current to near-zero during rest periods for the additional energy storage device, the controller establishing additional rest periods for the energy storage device when the additional energy storage device is capable of handling load requirements of the power network.

7. The system of claim 1, wherein the controller determines a length of time since a last state measurement of the energy storage device, and calculates a level of confidence in the accuracy of the last state measurement of the energy storage device based at least in part on the length of time since the last measurement of the state of the energy storage device, and wherein the first cost metric comprises the level of confidence in the accuracy of the last state measurement.

8. The system of claim 1, wherein the sensor is associated with a predetermined level of accuracy, and wherein the controller stores the predetermined level of accuracy of the sensor in a memory, and calculates a level of confidence in the accuracy of a last state measurement of the energy storage device based at least in part on the predetermined level of accuracy of the sensor, and wherein the first cost metric comprises the level of confidence in the accuracy of the last state measurement.

9. The system of claim 1, wherein the controller is programmed to:
store a preselected minimum level of confidence in an energy storage device state measurement,
calculate a level of confidence in a measurement obtained from a last state measurement of the energy storage device,
compare the measurement of the last energy storage device state measurement with the preselected minimum level of confidence,
disconnect the energy storage device based at least in part on the comparison, and
enable the updated state measurement of the energy storage device.

10. The system of claim 1, wherein the controller is programmed to:
determine whether setting the energy storage device current to the level that enables an estimation of the state will have a negative impact on the normal operation,
determine at least a portion of the second cost metric based on whether the state will have a negative impact on the normal operation,
compare the measurement of a last state measurement of the energy storage device with a preselected minimum level of confidence,
determine at least a portion of the first cost metric based on a comparison of the last state measurement of the energy storage device with the preselected minimum level of confidence, and
disconnect the energy storage device to enable a new state measurement of the energy storage device based on both the first cost metric and the second cost metric.

11. The system of claim 1, wherein the power network is a vehicle power network.

12. The system of claim 1, wherein the state of the energy storage device comprises a state of charge.

13. A computer-implemented method for controlling the application of stored electrical power to a vehicle power network, wherein an energy storage device is connected to the vehicle power network to provide stored power electrical current to the power network for operation of a power network load, the method comprising:
establishing energy storage device rest periods during which a current through the energy storage device is reduced to a level that enables an estimation of a state of the energy storage device, wherein the rest periods are established based on a comparison between a first cost metric associated with obtaining a new measurement of the energy storage device and a second cost metric associated with a disruption of normal vehicle operation during the rest period; and
measuring a state of the energy storage device during the rest periods.

14. The computer-implemented method of claim 13, further comprising:
controlling a power producing unit connected to the power network to provide power from a power producing unit to the energy storage device when connected to the power network.

15. The computer-implemented method of claim 13, further comprising:
selectively providing additional current to the power network from an additional energy storage device to operate the power network load.

16. The computer-implemented method of claim 13, wherein the energy storage device is a first energy storage device, and the method further comprises:
providing power to the power network from a second energy storage device; and
establishing the rest periods for the first energy storage device when the second energy storage device is capable of handling load requirements of the power network.

17. The computer-implemented method of claim 13, further comprising:
establishing the rest periods when a power producing unit can handle an increased load resulting from disconnection of the energy storage device.

18. The computer-implemented method of claim 13, further comprising:
storing a most recent measurement by a sensor of the state of the energy storage device; and
storing a level of confidence of the most recent measurement of the energy storage device.

19. The computer-implemented method of claim 13, further comprising:
determining a length of time since a last state measurement; and
calculating a level of confidence in an accuracy of the last state measurement based at least in part on a length of time since the last state measurement was measured.

20. The computer implemented method of claim 13, further comprising:

storing a predetermined level of accuracy of the sensor; and calculating a level of confidence in the predetermined level of accuracy of a last state measurement based at least in part on the predetermined level of accuracy of the sensor.

21. The computer-implemented method of claim 13, further comprising:

storing a preselected minimum level of confidence in a state measurement of the energy storage device;

calculating a level of confidence in a measurement obtained from a last state measurement of the energy storage device;

comparing the measurement of the last state measurement of the energy storage device with the preselected minimum level of confidence; and disconnecting the energy storage device to enable a new state measurement of the energy storage device based at least in part on said comparison.

22. The computer-implemented method of claim 13, further comprising:

determining whether setting a current of the energy storage device to the level that enables estimation of the state of the energy storage system will have a negative impact on the normal vehicle operation based on the second cost metric;

comparing a measurement of a last occurrence of a state measurement with a preselected minimum level of confidence based on the first cost metric; and disconnecting the energy storage device to enable a new state measurement based in response to both the first cost metric and the second cost metric.

23. The computer-implemented method of claim 13, wherein the state of the energy storage device comprises a state of charge.

24. A computer-implemented method for controlling provision of power to a power network, comprising:

providing electrical current to the power network from an energy storage device for operation of a power network load;

reducing the current through the energy storage device with a switch to a level that enables an estimation of a state of the energy storage device for a rest period; and measuring a state of the energy storage device within a certain level of accuracy during the rest period.

25. The computer-implemented method of claim 24, further comprising:

establishing a strategy of operation;

monitoring operation of a power producing unit;

storing a last measurement of a state;

establishing a declining level of confidence in the last measurement of the state; and establishing when the rest periods occur by optimizing between minimization of disruption to the normal operation and the declining level of confidence in the last measurement of the state.

26. The computer-implemented method of claim 24, wherein the state of the energy storage device comprises a state of charge.

27. A system for providing power to a vehicle power network, comprising:

a first energy storage device connected to the vehicle power network;

a second energy storage device connected to the vehicle power network;

a controller that establishes rest periods for the each of the first energy storage device and the second energy storage device during which current through the respective energy storage device is reduced to a level that enables an estimation of the state of the energy storage device, the rest periods established according to a strategy so as to not adversely affect the normal operation of the vehicle.

28. The system of claim 27, wherein the state of the energy storage device comprises a state of charge.

* * * * *